US006651358B2

(12) United States Patent
Giacobbe

(10) Patent No.: US 6,651,358 B2
(45) Date of Patent: Nov. 25, 2003

(54) HEAT TRANSFER FLUIDS AND METHODS OF MAKING AND USING SAME COMPRISING HYDROGEN, HELIUM AND COMBINATIONS THEREOF

(75) Inventor: Frederick W. Giacobbe, Naperville, IL (US)

(73) Assignee: American Air Liquide, Inc., Fremont, CA (US)

( * ) Notice: Subject to any disclaimer, the term of this patent is extended or adjusted under 35 U.S.C. 154(b) by 66 days.

(21) Appl. No.: 10/003,903

(22) Filed: Oct. 31, 2001

(65) Prior Publication Data
US 2002/0178609 A1 Dec. 5, 2002

Related U.S. Application Data
(60) Provisional application No. 60/287,476, filed on Apr. 30, 2001.

(51) Int. Cl.[7] .............................. F26B 21/06; C09K 5/00
(52) U.S. Cl. ................. 34/428; 34/72; 34/75; 34/435; 252/71
(58) Field of Search .......................... 34/380, 428, 435, 34/443, 507, 508, 509, 510, 72, 73, 74, 75; 252/70, 71; 65/434

(56) References Cited

U.S. PATENT DOCUMENTS

| 3,813,889 A | * | 6/1974 | Allam et al. .................. 62/22 |
|---|---|---|---|
| 4,126,436 A | | 11/1978 | Bailey |
| 4,154,592 A | | 5/1979 | Bailey |
| 4,166,799 A | | 9/1979 | Giacobbe |
| 4,208,200 A | | 6/1980 | Claypoole et al. |
| 4,400,190 A | | 8/1983 | Briere |
| 4,437,870 A | | 3/1984 | Miller |
| 4,514,205 A | | 4/1985 | Darcangelo et al. |
| 4,531,959 A | | 7/1985 | Kar et al. |
| 4,594,088 A | | 6/1986 | Paek et al. |
| 4,627,244 A | | 12/1986 | Willhoft |
| 4,664,689 A | | 5/1987 | Davis |
| 4,673,427 A | | 6/1987 | Van Der Giessen et al. |
| 4,761,168 A | | 8/1988 | Blyler, Jr. et al. |
| 4,838,918 A | | 6/1989 | Vaughan et al. |
| 4,913,715 A | | 4/1990 | Jochem et al. |
| 4,966,615 A | | 10/1990 | Linden et al. |

(List continued on next page.)

FOREIGN PATENT DOCUMENTS

| EP | 0 079 186 A1 | 5/1983 |
|---|---|---|
| EP | 0 321 182 A2 | 6/1989 |
| JP | 246837 | 10/1987 |
| SU | 1723059 A1 | 3/1992 |
| WO | WO 83 02268 A1 | 7/1983 |

OTHER PUBLICATIONS

Vanco, Michael R., "Analytical Comparison of Relative Heat–Transfer Coefficients and Pressure Drops of Inert Gases and Their Binary Mixtures," National Aeronautics and Space Administration, TN D2677, Feb. 1965, pp. 1–15, Washington, D.C.

Giacobbe, F.W., "Heat Transfer Capability of Selected Binary Gaseous Mixtures Relative to Helium and Hydrogen," Applied Thermal Engineering, 1998, pp. 199–206, vol. 18, Nos. 3–4.

(List continued on next page.)

Primary Examiner—Ira S. Lazarus
Assistant Examiner—K. B. Rinehart
(74) Attorney, Agent, or Firm—Linda K. Russell; Christopher J. Cronin

(57) ABSTRACT

Heat transfer fluid mixtures and methods of making and using same are presented. The inventive heat transfer fluid mixtures consist essentially of at least one light gas, such as hydrogen, and at least one heavy fluid, such as helium wherein the mixture will not be capable of mixing with air in any proportions to produce a self-sustaining flammable or combustible mixture, or wherein a concentration of hydrogen is sufficient to reduce cost of the mixture to an amount substantially less than cost of pure helium.

25 Claims, 3 Drawing Sheets

U.S. PATENT DOCUMENTS

Figure 1:
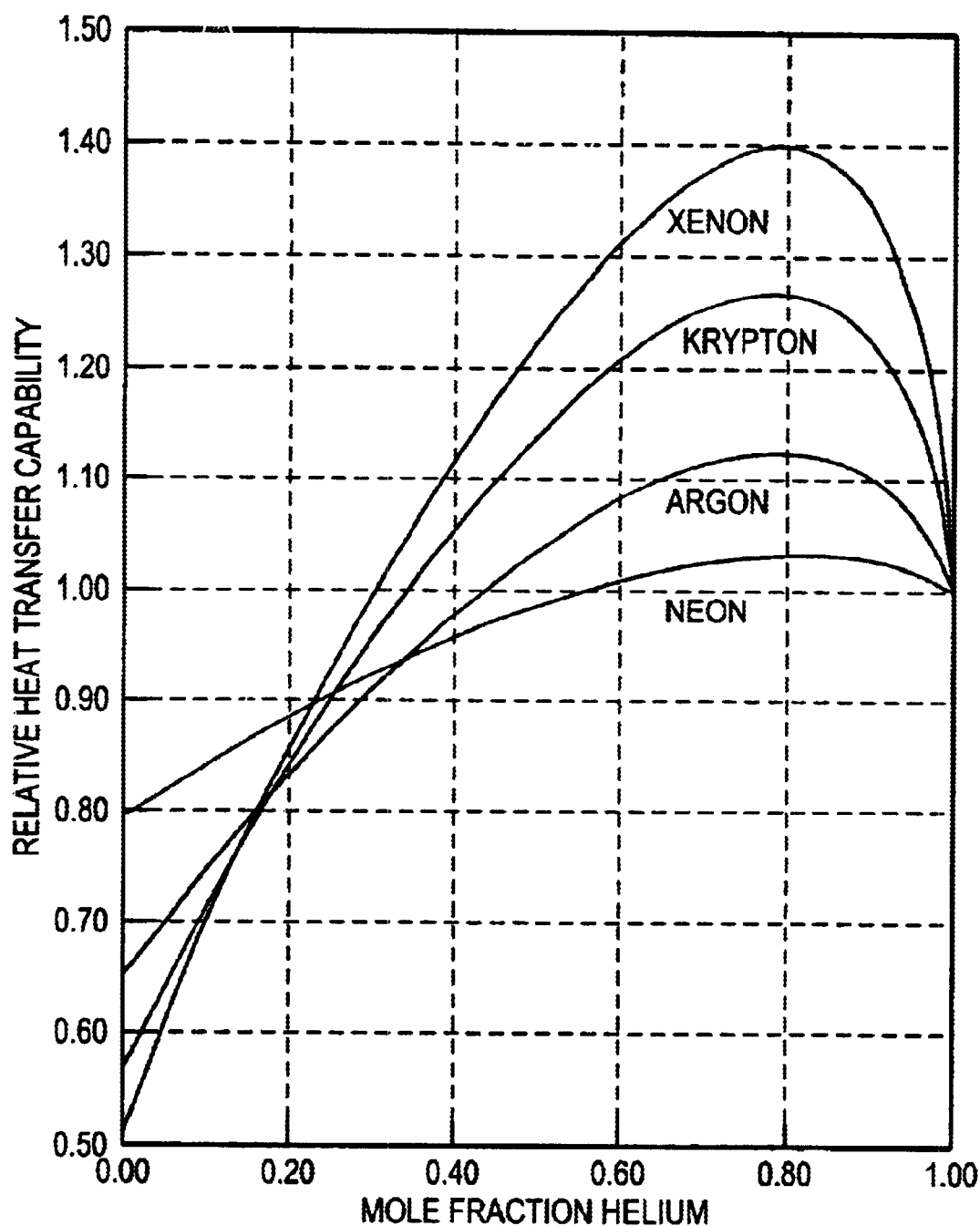

| | | | |
|---|---|---|---|
| 4,988,374 A | | 1/1991 | Harding et al. |
| 4,995,892 A | | 2/1991 | Garrett et al. |
| 5,059,229 A | | 10/1991 | Blankenship |
| 5,160,359 A | | 11/1992 | Strackenbrock et al. |
| 5,277,245 A | * | 1/1994 | Dutta et al. ............ 165/104.16 |
| 5,284,499 A | | 2/1994 | Harvey et al. |
| 5,367,137 A | * | 11/1994 | Hammarlund et al. ........ 219/74 |
| 5,377,491 A | | 1/1995 | Schulte |
| 5,452,583 A | * | 9/1995 | Schulte .......................... 62/63 |
| 5,568,728 A | | 10/1996 | Sapsford |
| 5,606,861 A | | 3/1997 | Renz |
| 5,897,682 A | | 4/1999 | Koaizawa et al. |
| 5,921,091 A | | 7/1999 | Foss et al. |
| 6,092,391 A | | 7/2000 | Chludzinski |
| 6,108,937 A | * | 8/2000 | Raaijmakers ................ 34/433 |
| 6,125,638 A | | 10/2000 | Ji et al. |
| 6,215,106 B1 | * | 4/2001 | Boas et al. ................. 216/390 |
| 6,253,575 B1 | | 7/2001 | Chludzinski |
| 6,254,666 B1 | | 7/2001 | Li et al. |
| 6,290,906 B1 | * | 9/2001 | MacNeal ..................... 422/30 |
| 6,425,250 B1 | * | 7/2002 | Acharya et al. ................. 62/6 |

OTHER PUBLICATIONS

Holoboff, R., et al., "Gas Quenching With Helium," Advanced Materials & Processes, Feb. 1993, pp. 23–26, vol. 143, No. 2.

Bird, R.B., et al., Transport Phenomena, 1960, pp. 392–393.

McEligot, D.M., et al., "Internal Forced Convection to Mixtures of Inert Gases", Int. J. Heat Mass Transfer, Pergamon Press 1977, pp. 475–486, vol. 20, Great Britain.

Bammert, K., et al., "The Influence of He–Ne, He–N2, nd He–CO2, Gas Mixtures and Closed–Cycle Gas Turbines," ASME Reference Paper, 74–GT–124, 1974, pp. 1–8.

Hawley's Condensed Chemical Dictionary, Twelfth Edition, 1993, p. 525.

Montierth, M.R., "Optical Fiber Drawing Techniques," Optical Spectra, Oct. 1978, pp. 42–48.

National Refrigerants, "Technical Updates: Alternative Refrigerant Terminology", http://www.refrigerants.com/1tterm.htm, Aug. 2, 2001, pp. 1–3.

Lavelle, James, Technical Updates: "Understanding Fractionation of Refrigerant Blend," National Refrigerants, http://www.refrigerants.com/undfract.htm, Aug. 2, 2001, pp. 1–4.

Rajala, Markku, et al., "Combination Furnace for Drawing Large Optical Fiber Preforms at High Speed," Internatioal Wire and Cable Symposium Proceedings, 1998, pp. 483–488.

Giacobbe, F.W., "Estimation of Prandtl Numbers in Binary Mixtures of Helium and Other Noble Gases," J. Acoust. Soc. Am. 96, Dec. 1994, pp. 3568–3580.

Kirk–Othmer, "Fuel Resources to Heat Stabilizers," Encyclopedia of Chemical Technology, 1994, pp. 614–617, $4^{th}$ Ed., vol. 12.

Hall, W. James, "Concentrating on Reflow's Cooling Zones", www.epp.com, Mar. 2001, pp. 44–51.

Kirov, V.S., et al., "Determination of Heat–Transfer Coefficient for Gas Mixtures Containing Helium and Hydrogen," Odessa Polytechnic Institute, Translated from Inzhenerno–Fizicheskii Zhurnal, Feb. 1974, pp. 152–154, vol. 26, No. 2.

* cited by examiner

HEAT TRANSFER FLUIDS AND METHODS OF MAKING AND USING SAME COMPRISING HYDROGEN, HELIUM AND COMBINATIONS THEREOF

CROSS-REFERENCE TO RELATED APPLICATIONS

This application claims priority from provisional patent application serial No. 60/287,476, filed Apr. 30, 2001, which is incorporated by reference herein.

BACKGROUND OF THE INVENTION

1. Field of the Invention

This invention relates to novel compositions comprising substantially pure hydrogen and substantially pure helium and their use as heat transfer fluids in a variety of applications.

2. Related Art

Pure or substantially pure helium has excellent heat transfer properties. For example, helium is typically employed to enhance fiber cooling during the optical fiber drawing process because it is chemically inert and because of its heat transfer properties. Of the common pure gases, only pure hydrogen has a higher thermal conductivity than pure helium. However, hydrogen is not as inert as helium and it is more hazardous to employ in certain gas-related heat transfer applications than any inert gas. Therefore, hydrogen is typically avoided as a gaseous heat transfer medium in some (but not all) cooling or heating process applications.

It is generally accepted that binary mixtures of helium (or hydrogen) with other gases will have better heat transfer coefficients than the pure gases themselves. See, for example, M. R. Vanco, "Analytical Comparison of Relative Heat-Transfer Coefficients and Pressure Drops of Inert Gases and Their Binary Mixtures, NASA TN D2677 (1965); F. W. Giacobbe, "Heat Transfer Capability of Selected Binary Gaseous Mixtures Relative to Helium and Hydrogen", Applied Thermal Engineering Vol. 18, Nos. 3–4, pp.199–206 (1998); R. Holoboffet al., "Gas Quenching With Helium", Advanced Materials & Processes, Vol.143, No. 2, pp.23–26 (1993). In particular, Holoboff et al. noted that in the context of a heat treating furnace, by changing to an optimum helium/argon mixture, a customer was able to heat treat parts that could not be processed as rapidly as when using argon alone, while maintaining lower operating costs than normally required when using 100% helium. In a separate example, the same authors also recognized the benefits of increasing the fan speed (gas circulation velocity) on specimen cooling rates when using pure helium and pure nitrogen in cooing applications. However, there is no teaching or suggestion of the influence of heat transfer fluid mixture velocity on cooling rate for optimized mixtures of heat transfer fluids.

For illustrative purposes, according to earlier theories the relative heat transfer capability of helium plus one other noble gas compared to pure helium may be seen in FIG. 1. In FIG. 1, pure helium has been arbitrarily assigned a relative heat transfer capability of 1.0 in order to deliberately avoid the use of a more complicated system of SI heat transfer units. So, if a binary gas mixture containing helium has a heat transfer capability of 2.0 (relative to pure helium), it is assumed from this data that gas mixture will be 2.0 times more effective in any heat transfer process employing that gaseous mixture instead of pure helium alone. And, as a simplified illustration of the potential helium savings using this data, if the best binary gas mixture contained only 50 percent (by volume or mole fraction) helium plus 50 percent of some other gas, only ½ of that gas mixture would be needed to perform the same cooling function as the pure helium alone. Therefore, only 25 percent of the helium that would have been required for a particular heat exchange process using pure helium would be needed during the same cooling process employing the gas mixture.

Figure 2:
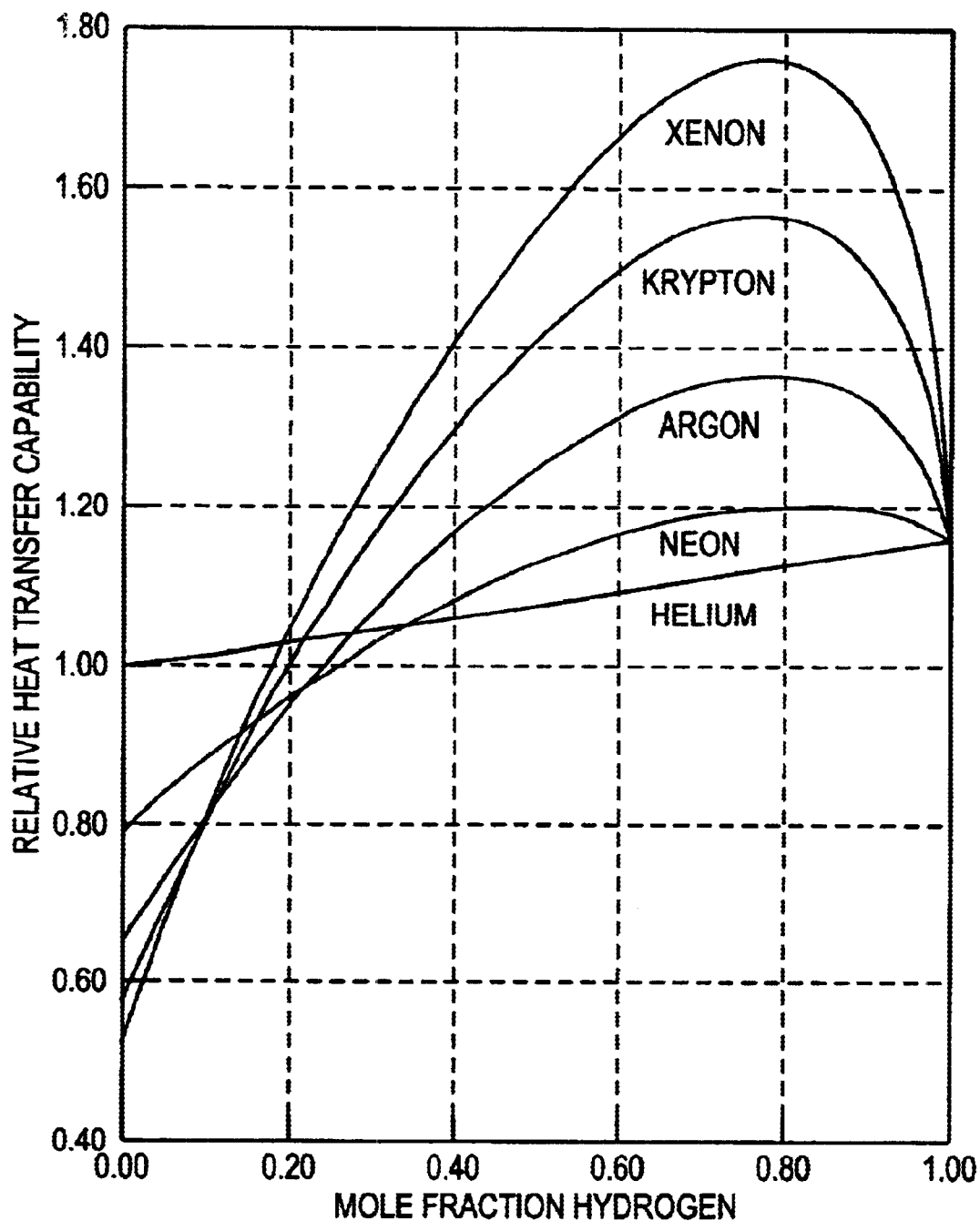

In FIG. 2, and also according to earlier theories, the optimum composition and approximate relative heat transfer capability of hydrogen plus one noble gas with respect to pure helium is illustrated. In FIG. 2, pure helium has also been arbitrarily assigned a relative heat transfer capability of 1.0. So, if a binary gas mixture containing only hydrogen and argon (but no helium) has a heat transfer capability of 1.4 (relative to pure helium), that gas mixture presumably will be 1.4 times more effective in any heat transfer process employing that gaseous mixture instead of pure helium alone. And, since no helium is required to produce this effect, the helium usage is cut to zero. Furthermore, since hydrogen and argon are typically much less expensive than helium, the overall cost of the hydrogen/argon coolant gas stream will tend to be negligible compared to a pure (or relatively pure) helium coolant gas steam.

It should be emphasized that the data presented in FIGS. 1 and 2 are theoretical and based on turbulent flow for all gases and gas mixtures considered. However, in the seminal work of R. B. Bird, W. E. Stewart, and E. N. Lightfoot, Transport Phenomena, pp. 392–393 (1960) it was pointed out that "the heat-transfer coefficient depends in a complicated way on many variables, including the fluid properties (k, $\mu$, $\rho$, $C_p$), the system geometry, the flow velocity, the value of the characteristic temperature difference, and the surface temperature distribution." In engineering design, therefore, use of constant property idealization frequently leads to either a greater built in safety factor, or a dangerous situation if the other extreme is taken. See D. M. McEligot, et al., "Internal Forced Convection to Mixtures of Inert Gases", Int. J. Heat Mass Transfer, Vol. 20, pp. 475–486 (1977).

In light of the unexpected nature of heat transfer coefficients of fluids, it would be advantageous in many heat transfer situations common in engineering to employ a heat transfer fluid mixture consisting essentially of pure hydrogen and helium that can easily be changed in composition to take advantage of the heat transfer properties of hydrogen, without the dangerous explosive characteristics of pure hydrogen, or to reduce the cost of using pure helium.

SUMMARY OF THE INVENTION

In accordance with the present invention, compositions consisting essentially of substantially pure hydrogen and substantially pure helium are presented (that can be advantageously employed in heat transfer applications, such as glass fiber cooling applications) which significantly reduce the danger of using pure hydrogen while providing nearly the same heat transfer properties as pure hydrogen. As used herein the term "hydrogen" means molecular hydrogen, or $H_2$. It has been discovered, quite unexpectedly, that heat transfer fluid mixtures consisting essentially of hydrogen and helium, plus such optional fluids such as argon, when flowing past a heat transfer surface at very low bulk velocity or very high bulk velocity, exhibit heat transfer coefficients that are less than but close to that of the pure hydrogen flowing at the same bulk velocity. Therefore, while compositions of the invention might require slightly more heat transfer area than pure hydrogen to achieve the same characteristic temperature difference in a fluid being heated or cooled, since the inventive compositions are much less explosive than pure hydrogen, there is an opportunity for better overall safety and longevity of equipment. Alternatively, if the designer allows for a slightly higher characteristic temperature difference, no change in heat transfer area is required. Furthermore, due to significant improvements in the heat transfer coefficients of these gas mixtures over substantially pure hydrogen when flowing at bulk velocities between very low and very high bulk velocity, the heat transfer designer may decide to use the inventive compositions and vary a parameter, such as concentration, bulk velocity, system pressure, characteristic temperature difference, and the like, to suit high demand time periods. For example, during times of high cool air demand in the summer months, a refrigeration unit employing one of the compositions may vary the concentration ratio of gases and the bulk velocity to achieve a higher characteristic temperature difference (better cooling).

As used herein the term "cooling" includes freezing. The term "heating" includes boiling, vaporizing, and the like.

The term "substantially pure hydrogen" means a composition that includes only impurities or additives in such amounts that do not substantially lessen the heat transfer characteristics of pure hydrogen. The term "substantially pure helium" means a composition that includes only impurities or additives in such amounts that do not substantially lessen the heat transfer characteristics of pure helium. An example of an impurity in hydrogen might be carbon monoxide, as when the substantially pure hydrogen is derived from a synthesis gas. An example of an impurity in helium might be methane, when the substantially pure helium is derived from natural gas.

A first aspect of the invention is a heat transfer fluid mixture consisting essentially of substantially pure hydrogen and substantially pure helium, wherein a concentration of hydrogen in the mixture is an amount wherein:

a) the mixture will not be capable of mixing with air in any proportions to produce a self-sustaining flammable or combustible mixture, or b) wherein the concentration of hydrogen is sufficient to reduce the cost of the mixture to an amount substantially less than the cost of pure helium.

As used herein the term "combustible" means a mixture of the invention that will burn at any temperature, irrespective of its ease of ignition, while "flammable" means a mixture of the invention which is a member of a special group of combustible mixtures that ignite easily and burn rapidly. See Hawley's Condensed Chemical Dictionary, Twelfth Edition (1993), page 525.

As used herein the term "substantially less than the cost of pure helium" means that the cost of the compositions of the invention are preferably 10 percent less than the cost of pure helium, more preferably 20 percent less, and even more preferably 50 percent less than the cost of pure helium.

The inventive heat transfer fluid mixtures preferably have hydrogen concentration ranging from about 0.1 mole percent to about 1 mole percent; mixtures having from about 1 mole percent to about 10 mole percent hydrogen; mixtures having from about 10 mole percent to about 20 mole percent hydrogen. Particularly preferred heat transfer fluid mixtures are those having hydrogen concentration ranging from about 20 mole percent to about 30 mole percent; those having hydrogen concentration ranging from about 30 mole percent to about 40 mole percent; those wherein the hydrogen has a concentration ranging from about 40 mole percent to about 50 mole percent; and those wherein the hydrogen has a concentration ranging from about 50 mole percent to about 99 mole percent.

In certain applications, such as optical fiber consolidation, the inventive heat transfer fluid mixtures preferably have no more than about 100 ppm water, more preferably no more than about 10 ppm water, and more preferably no more than about 1 ppm water.

A second aspect of the invention is a method of cooling or heating an item or material, the method comprising contacting the item or material with one of the heat transfer fluid mixtures of the invention, the contacting selected from the group consisting of directly contacting, indirectly contacting, and combinations thereof.

A third aspect of the invention is a method of cooling or heating an item traversing through a substantially confined space, the method comprising contacting the item with one of the heat transfer fluid mixtures of the invention, the contacting selected from the group consisting of directly contacting, indirectly contacting, and combinations thereof.

A fourth aspect of the invention is a method of cooling a cylindrical optical fiber traversing through a heat exchanger, the method comprising contacting the cylindrical optical fiber with a gas mixture of the invention, the contacting selected from the group consisting of directly contacting, indirectly contacting, and combinations thereof.

A fifth aspect of the invention is a method of improving the cooling of a substantially cylindrical optical fiber traversing through a heat exchange device, the method comprising the step of contacting the optical fiber with a gas mixture consisting essentially of substantially pure hydrogen and substantially pure helium, the contacting selected from the group consisting of directly contacting, indirectly contacting, and combinations thereof, and making an adjustment either intermittently or continuously of a parameter during the cooling, the parameter selected from the group consisting of composition of the gas mixture, flow rate of the gas mixture into the heat exchange device, an amount of gas mixture contacting the fiber in counter-current fashion, an amount of gas mixture contacting the fiber in co-current fashion, composition of the gas mixture contacting the fiber in counter-current fashion, composition of the gas mixture contacting the fiber in co-current fashion, a temperature of the gas mixture being injected into the heat exchange device, a temperature of the gas mixture before contacting the fiber in counter-current fashion, a temperature of the gas mixture during contacting the fiber in counter-current fashion, a temperature of the gas mixture after contacting the fiber in counter-current fashion, a temperature of the gas mixture before contacting the fiber in a co-current fashion, a temperature of the gas mixture during contacting the fiber in a co-current fashion, a temperature of the gas mixture after contacting the fiber in a co-current fashion, a pressure of the gas mixture injected into the heat exchange device, a pressure of the gas mixture contacting the fiber in countercurrent fashion, and a pressure of the gas mixture contacting the fiber in a co-current fashion.

A sixth aspect of the invention is a method of improving cooling or heating of any hot or cold object or material in contact with a stagnant or flowing gas mixture in a confined space, the method comprising directly or indirectly contacting the object with a gas mixture consisting essentially of substantially pure hydrogen and substantially pure helium, and making an adjustment either intermittently or continuously of a parameter during the cooling or heating process, the parameter selected from the group consisting of a composition of the gas mixture, a flow rate of the gas mixture in contact with the object, an amount of gas mixture contacting the object, a composition of the gas mixture contacting the object, a temperature of the gas mixture injected into the confined space, a temperature of the gas mixture before contacting the object, a temperature of the gas mixture during contacting the object, a temperature of the gas mixture after contacting the object, a pressure of the gas mixture entering the confined space, and a pressure of the gas mixture contacting the object. One particularly preferred embodiment is that wherein the parameter adjustment is made automatically or manually based upon a measured parameter of the object or material that changes during the cooling or heating process.

Other aspects and advantages of the invention will become apparent after review of the description, drawing figures, and claims herein.

BRIEF DESCRIPTION OF THE DRAWING FIGURES

Figure 3:
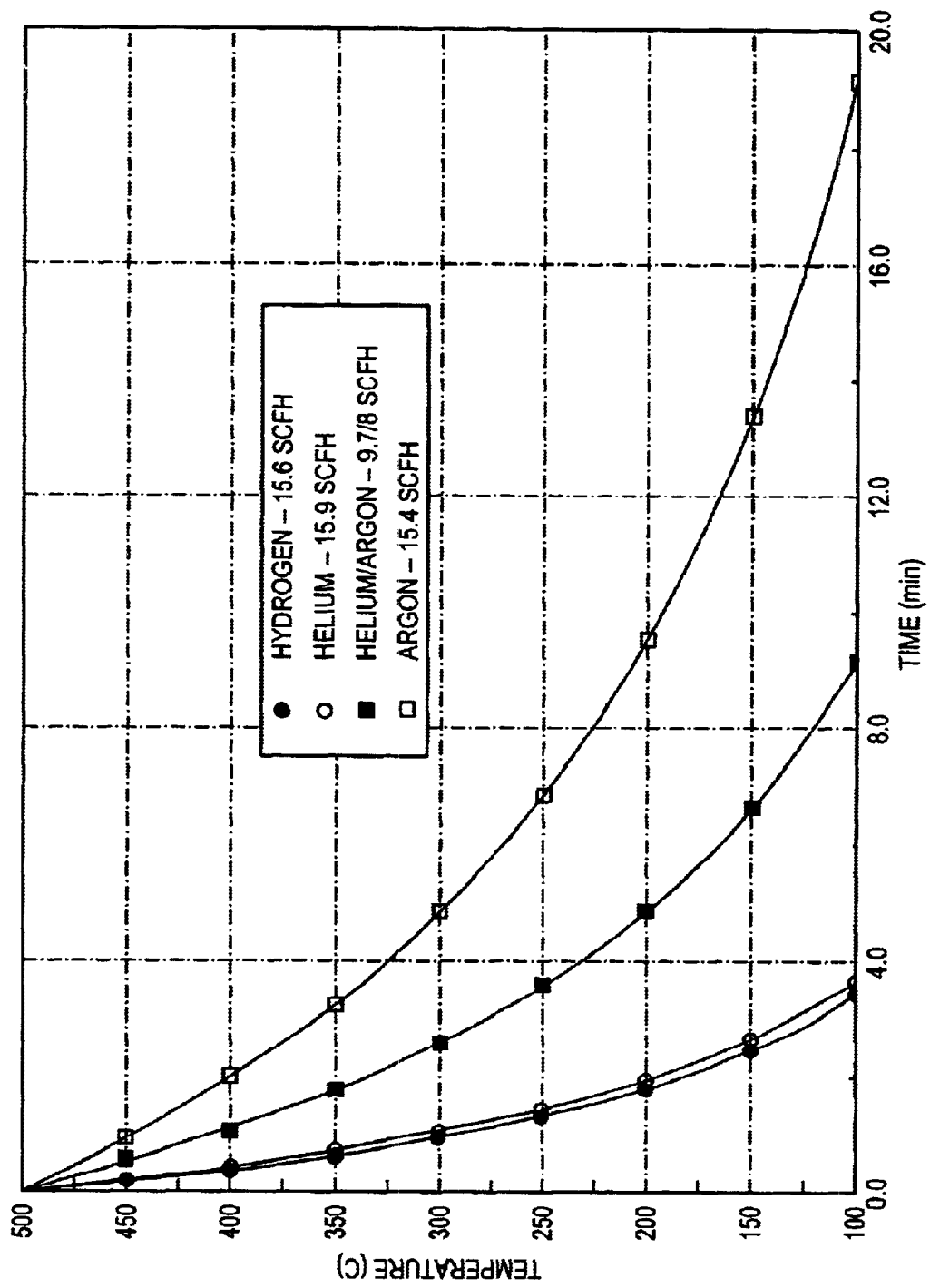

FIGS. 1 and 2 illustrate earlier theoretical beliefs and computations that mixtures of helium with another noble gas, and mixtures of hydrogen with another noble gas, are always more effective heat transfer fluids; and FIG. 3 illustrates graphically experimental data useful in describing the inventive heat transfer fluid mixtures.

DESCRIPTION OF PREFERRED EMBODIMENTS

Studies performed in our laboratories using gases showed that not only does the heat transfer coefficient vary with bulk velocity of the gas, but that there are certain mixtures of hydrogen and helium that, at certain flow regimes, have heat transfer properties as good as or better than pure hydrogen. In general, it was determined that the heat transfer coefficients for gases containing a relatively high concentration of a light gas and the balance a heavier gas are higher than the heat transfer coefficient of the individual gas stream only at a specific range of bulk velocity, referred to herein as the "critical bulk velocity range." Above or below this critical bulk velocity range, the light gas will have a higher heat transfer coefficient.

As used herein the term "fluid" means either gas, liquid, or combination of gas and liquid.

As used herein the term "consisting essentially of" means that the heat transfer fluid mixtures of the invention contain hydrogen and helium, and no other components in substantial concentration which might detract from the heat transfer capabilities of hydrogen and helium mixtures. Thus small percentages, up to 5 mole percent (but preferably less if the situation calls for lower amounts, such as when a dry atmosphere is called for), of other components are allowed, preferably selected from the group consisting of $H_2O$, $N_2$, $O_2$, $F_2$, Ne, $Cl_2$, Ar, $Br_2$, Kr, Xe, Rn, $CCl_3F$, $CCl_2F_2$, $CClF_3$, $CBrF_3$, $CF_4$, $CHCl_2F$, $CHClF_2$, $CHF_3$, $C_2Cl_4F_2$, $C_2Cl_3$, $F_3$, $C_2Cl_2F_4$, $C_2Br_2F_4$, $C_2ClF_5$, $C_2F_6$, $C_2H_4F_2$, $C_2H_2F_4$, $CH_4$, $C_2H_4$, $C_2H_6$, $C_3H_8$, $C_3H_6$, $C_4H_{10}$, $(CH_3)_3CH$, $NH_3$, CO, $CO_2$, $CCl_4$, $CH_3Cl$, $SO_2$, $SO_3$, NO, $NO_2$, $N_2O$, and mixtures thereof.

The heat transfer fluid mixtures of the invention may be made by a variety methods, for example mixing commercial grade or electronic grade hydrogen with commercial grade or electronic grade helium, both from cylinders, ton units, tube trailers, and the like. Other novel methods of manufacture include mixing synthesis gas (a mixture of CO and hydrogen obtained from the water gas shift reaction of methane with steam), with a helium stream.

Flammability Limits of Gas Mixtures Containing Hydrogen Plus One Inert Gas and Air Several experiments were performed in our laboratories. These were relatively crude experiments designed to give a rough estimation of the flammability limits that one could expect if these kinds of initially inert gas mixtures came into contact with air.

Pure hydrogen and one pure inert gas (helium and then argon) were combined at the outlet ends of two separate flow meters employed to separately monitor the flow of these gases prior to mixing. The gas pressure within the flow meters was also monitored. These gas mixtures were then passed (separately) thorough two round stainless steel (SS) tubes (one SS tube had an internal diameter of about 0.16 in. (0.41 cm) the other had an internal diameter of about 0.40 in. (1.02 cm) and both of these tubes were about 10 inches (24.5 cm) long) and then into the ambient air. Hydrogen flows rates were initially adjusted at levels high enough to allow the gas mixture, exiting the SS tube into the air, to burn continuously if deliberately ignited. Hydrogen gas flow rates were then slowly adjusted downward until the burning gas mixture was self-extinguished. These final flow conditions, of both gases, are listed in Table 1. These tabulated flow rates provide an indication of the maximum hydrogen concentration, in either argon or helium, that can exist within the initial mixture without the possibility of self-sustained combustion if that gas mixture were to leak into air (under normal ambient conditions), at the same combined flow rate or tube exit velocity. It should also be evident from this data that the type of gas mixed with hydrogen, as well as the gas mixture leak velocity, has some bearing upon the critical mixture composition that will or will not support a self-sustained combustion reaction in air. Therefore, it is not possible to precisely predict this critical mixture composition without also specifying the type of gas that is mixed with hydrogen or the gas mixture exit velocity as it leaks into the ambient air.

TABLE 1

Maximum Hydrogen Concentrations in Two Different Inert Gases That Will Not Burn in Air

| Gas | Corrected Gas Flow Rate (SCFH) | Gas Volume Percentage |
| --- | --- | --- |
| Tube ID = 0.16 in | | |
| Hydrogen | 31.2 | 22.0 |
| Helium | 110.6 | 78.0 |
| Total | 141.8 | 100.0 |
| Hydrogen | 11.8 | 25.1 |
| Argon | 35.2 | 74.9 |
| Total | 47.0 | 100.0 |
| Tube ID = 0.40 in. | | |
| Hydrogen | 23.1 | 14.7 |
| Helium | 134.1 | 85.3 |
| Total | 157.2 | 100.0 |
| Hydrogen | 7.7 | 15.1 |
| Argon | 43.3 | 84.9 |
| Total | 51.0 | 100.0 |

In accordance with the present invention, and as mentioned previously, the inventors herein have discovered that certain gaseous mixtures consisting essentially of substantially pure hydrogen and substantially pure helium may be employed that have substantially the same heat transfer capability (cooling or heating ability) as pure hydrogen, but without the inherent danger of pure hydrogen. In particular, by simply measuring the bulk velocity of the heat transfer fluid mixture, a characteristic temperature difference of the system (either the mixture or the item being heated or cooled) and the heating or cooling demand, safety increases may be realized by the operator of the process or equipment utilizing the inventive heat transfer fluid mixtures. While providing lower heat transfer for a given heat transfer area, the heat transfer fluid mixtures of the present invention can reduce the need for expensive safety mechanisms required for pure hydrogen, and may reduce insurance premiums.

This may be seen by reviewing FIG. 3. FIG. 3 contains graphical experimental data that illustrates the relative heat transfer behavior associated with the use of hydrogen, helium, argon and mixtures of helium and argon in a specific heat transfer (cooling in this case) application. The data on FIG. 3 was generated using a simple shell and tube laboratory heat exchanger, where coolant (water at 0° C.) flowed through the shell at 20 gal/minute (76 liters/minute) and the gas to be cooled flowed countercurrently to the coolant through a single tube. In separate tests, the hydrogen flow rate was 15.6 SCFH; the helium flow rate was 15.9 SCFH; the argon flow rate was 15.4 SCFH; and the helium/argon mixture flow rate was 9.7 SCFH helium mixed with 8.2 SCFH argon. Inside the tube was placed a cylindrical heating element which ran the entire length of the tube. The graph in FIG. 3 demonstrates the fact that both hydrogen and helium are substantially better gaseous cooling agents (and almost equal to each other in "cooling power") than either pure argon or mixtures of helium and argon when these gases or gas mixtures are forced to flow over an initially hot object. All of the gas and gas mixture flow rates tested were nearly the same so these results cannot be due to substantial flow rate differences between the respective pure gases or the gas mixture. These results also indicate that any mixture of hydrogen and helium, under nearly similar conditions, will be just as effective as a gaseous cooling agent as either of the pure gases alone. These experimental findings are an unexpected result because the thermal conductivity of pure helium and pure hydrogen, at 0° C. and 1 atmosphere (1.01 megaPascals) pressure is about $34.3 \times 10^{-5}$ and $41.9 \times 10^{-5}$ cal/(sec-cm-deg), respectively. Therefore, the difference between the thermal conductivities of pure hydrogen and pure helium are on the order of 22.2 percent. This fact alone would tend to lead one with ordinary skill in the art to predict that pure hydrogen would be substantially better than pure helium as a cooling agent. And, in light of these experimental findings, this is not the case.

Further testing of other tertiary mixtures consisting essentially of hydrogen and helium have revealed similar behavior. However, the choice of the third or more gases to be employed will depend primarily upon the high and low temperatures that the inventive heat transfer fluid mixtures are likely to experience during the heat exchange process, the flow rates (bulk velocity), and pressure of the system.

Preferably, when the heat transfer fluid mixtures of the invention are employed for cooling but not freezing, they are at moderate temperatures cooler than the object to be cooled, for example preferably entering the cooling device or area at no more than ambient temperature (about 25° C.), and preferably no higher than about 0° C. for cooling processes. For freezing processes the entry temperature is preferably no more than about −20° C.

When used for heating applications, the inventive heat transfer fluid mixtures preferably enter the heating device, or area where the item to be heated resides, at a temperature well above the demand temperature, but at least higher in temperature than the item or material to be heated to provide a sufficient driving force for heat exchange.

In general, the heat transfer fluid mixtures of the invention are beneficial in any system where a moving or non-moving item is intended to be heated or cooled, either through direct contact with the mixture, or indirect contact such as through a heat exchanger tube wall. In the optical fiber drawing art, the fiber typically moves through a heat exchanger and the gas mixture directly contacts the fiber (see for example FIG. 1 of U.S. Pat. No. 6,125,638, incorporated herein by reference for its teaching of an optical fiber cooling heat exchanger). While the heat transfer coefficient of a gas flowing past a stationary cylinder has been defined, for example as discussed in Holoboff et al. "Gas Quenching With Helium", Advanced Materials & Processes, February 1993, there are uncertainties involved in any particular heat transfer system that make prediction difficult. For example, in the fiber drawing art, the optical fiber is moving through a heat exchanger, being drawn by a spool. In one method, the coolant gas typically enters the exchanger at about the mid-point of the fiber in the exchanger, and then splits, some of the gas traveling co-currently with the fiber, and some traveling counter-currently in relation to fiber flow direction, as depicted in the 638 patent.

The following example demonstrates the range of use of the inventive heat transfer fluid mixtures and methods of the invention.

EXAMPLE

Cooling of Optical Fibers

Production of optical fibers typically employs helium or hydrogen to dry glass preforms during consolidation, for drawing the fiber during heating, and for cooling the drawn fiber, especially if the fiber is to be coated with a resin for toughening the fiber, and making it more resistant to fatigue, abrasion, and the like. U.S. Pat. No. 6,092,391 discloses some details of a consolidation furnace. This patent discloses the use of a sensor (either composition, pressure, temperature, or flow rate) on the exhaust stream. Another patent, U.S. Pat. No. 5,284,499, discloses how a glass preform is drawn through a heating element, a diameter measuring device, and a muffle tube. The cooling gas (helium or argon) flows into the top of the tube in this arrangement, and is heated as it passes into contact with the fiber, which is typically at a temperature of about 2100–2300° C. The fiber is typically drawn under tension of about 9 grams, at a draw rate of about 9 meters/second. The gas flow rate is disclosed to be about 3 standard liters per minute (slpm). In this patent, it is preferred to keep a boundary layer of gas near the fiber to thus maintain the boundary layer and prevent air currents, which might produce "bow" (fiber bending) and "airline" (small holes in the fiber).

Other patents in the area of optical fiber manufacturing interestingly call for more turbulent flow of the gas to cool the fiber as quickly as possible so that resins may be applied. Representative of this is U.S. Pat. No. 4,437,870. The first mention in U.S. patent documents of helium used in optical fiber manufacture as a coolant appears to be U.S. Pat. No. 4,154,592, where it was recognized that helium apparently reduced thermal gradients de to its higher thermal conductivity compared to oxygen and nitrogen. Mixtures of helium/oxygen/nitrogen were discussed. Another interesting patent is U.S. Pat. No. 5,059,229, which discloses the use of helium/hydrogen mixtures, but no mention of the heat transfer effects. The point was to introduce hydrogen into the coolant gas to prevent "transient hydrogen sensitive attenuation." There was no recognition in any of these patents of heat transfer fluid mixtures that could be changed in composition and/or flow rate (bulk velocity) to achieve both lower cost and effective cooling.

The present inventive heat transfer fluid mixtures can be advantageously employed in optical fiber consolidation, drawing, and fiber cooling to decrease costs while achieving almost the same cooling as pure helium.

The scope of the claims that follow is not intended to be limited by the description of preferred embodiments. Those skilled in the heat transfer art, after reading this disclosure, will recognize that the inventive compositions and methods are useful in a variety of heating and cooling applications.

What is claimed is:

1. A method of improving the cooling of a cylindrical optical fiber traversing through a heat exchange device, the method comprising
   a) contacting the optical fiber with a heat transfer fluid mixture consisting essentially of substantially pure hydrogen and substantially pure helium for use in heat transfer applications, said contacting selected from the group consisting of directly contacting, indirectly contacting, or a combination thereof, wherein
      i) the mixture will not be capable of mixing with air in any proportions to produce a self-sustaining flammable or combustible mixture, or
      ii) wherein a concentration of hydrogen is sufficient to reduce cost of the mixture to an amount substantially less than cost of pure helium; and
   b) making an adjustment, either intermittently or continuously of a parameter during the cooling, the parameter selected from the group consisting of a composition of the gas mixture, a flow rate of the gas mixture into the heat exchange device, an amount of gas mixture contacting the fiber in counter-current fashion, an amount of gas mixture contacting the fiber in co-current fashion, a composition of the gas mixture contacting the fiber in counter-current fashion, a composition of the gas mixture contacting the fiber in co-current fashion, a temperature of the gas mixture before injection into the heat exchange device, a temperature of the gas mixture either before, during or after contacting the fiber in counter-current fashion, a temperature of the gas mixture either before, during or after contacting the fiber in a co-current fashion, a pressure of the gas mixture before injection into the heat exchange device, a pressure of the gas mixture contacting the fiber in countercurrent fashion, and a pressure of the gas mixture contacting the fiber in a co-current fashion.

2. A method in accordance with claim 1 wherein the hydrogen has a concentration ranging from about 0.1 mole percent to about 1 mole percent.

3. A method in accordance with claim 1 wherein the hydrogen has a concentration ranging from about 1 mole percent to about 10 mole percent.

4. A method in accordance with claim 1 wherein the hydrogen has a concentration ranging from about 10 mole percent to about 20 mole percent.

5. A method in accordance with claim 1 wherein the hydrogen has a concentration ranging from about 20 mole percent to about 30 mole percent.

6. A method in accordance with claim 1 wherein the hydrogen has a concentration ranging from about 30 mole percent to about 40 mole percent.

7. The method in accordance with claim 1, wherein the hydrogen has a concentration ranging from about 40 mole percent to about 50 mole percent.

8. The method in accordance with claim 1, wherein the hydrogen has a concentration ranging from about 40 mole percent to about 50 mole percent.

9. A method in accordance with claim 1 wherein said parameter adjustment is made automatically or manually based upon some measured parameter that may change during a heat exchange process (cooling or heating).

10. A method of improving cooling or heating of any hot or cold object in contact with a stagnant or flowing gas mixture, the method comprising
    a) directly or indirectly contacting the object with a heat transfer fluid gas mixture consisting essentially of substantially pure hydrogen and substantially pure helium for use in heat transfer applications, wherein
       i) the mixture will not be capable of mixing with air in any proportions to produce a self-sustaining flammable or combustible mixture, or
       ii) wherein a concentration of hydrogen is sufficient to reduce cost of the mixture to an amount substantially less than cost of pure helium; and
    b) making an adjustment (either intermittently or continuously) of a parameter during the cooling or heating process: the parameter selected from the group consisting of a composition of the gas mixture before contacting the object, a flow rate of the gas mixture in contact with the object, an amount of gas mixture contacting the object, a composition of the gas mixture in contact with the object, a temperature of the gas mixture either before, during and/or after contacting the object, a temperature of the gas mixture either before, during and/or after contacting the object, a pressure of the gas mixture before it contacts the object, and a pressure of the gas mixture contacting the object.

11. A method in accordance with claim 10 wherein said parameter adjustment is made automatically or manually based upon some measured parameter that may change during a heat exchange process (cooling or heating).

12. A method of improving the cooling of a cylindrical optical fiber traversing through a heat exchange device, the method comprising
    a) contacting the optical fiber with a heat transfer fluid gas mixture consisting of substantially pure hydrogen and substantially pure helium, said contacting selected from the group consisting of directly contacting, indirectly contacting, or combination thereof; and
    b) making an adjustment, either intermittently or continuously, of a parameter during the cooling, the parameter selected from the group consisting of a composition of the gas mixture, flow rate of the gas mixture into the heat exchange device, an amount of gas mixture contacting the fiber in counter-current fashion, an amount of gas mixture contacting the fiber in co-current fashion, a composition of the gas mixture contacting the fiber in counter-current fashion, a composition of gas mixture contacting the fiber in co-current fashion, a temperature of the gas mixture before injection into the heat exchange device, a temperature of the gas mixture either before, during or after contacting the fiber in counter-current fashion, a temperature of the gas mixture either before, during, or after contacting the fiber in a co-current fashion, a pressure of the gas mixture before injection into the heat exchange device, a pressure of the gas mixture contacting the fiber in countercurrent fashion, and a pressure of the gas mixture contacting the fiber in a co-current fashion.

13. A method in accordance with claim 12 wherein said parameter adjustment is made automatically or manually based upon some measured parameter that may change during a heat exchange process (cooling or heating).

14. A method in accordance with claim 13 wherein said parameter adjustment is made automatically or manually based upon some measured parameter that may change during a heat exchange process (cooling or heating).

15. The method in accordance with claim 12 wherein the hydrogen has a concentration ranging from about 10 mole percent to about 40 mole percent.

16. A method in accordance with claim 12 wherein the hydrogen has a concentration ranging from about 40 mole percent to about 50 mole percent.

17. A method in accordance with claim 12 wherein the hydrogen has a concentration ranging from about 50 mole percent to about 99.9 mole percent.

18. A heat transfer fluid gas mixture consisting essentially of substantially pure hydrogen and substantially pure helium for use in heat transfer applications, the hydrogen having a concentration ranging from about 40 mole percent to about 50 mole percent, wherein:
   a) the mixture will not be capable of mixing with air in any proportions to produce a self-sustaining flammable or combustible mixture, or
   b) wherein a concentration of hydrogen is sufficient to reduce cost of the mixture to an amount substantially less than cost of pure helium.

19. A method of cooling or heating an item, the method comprising contacting the item with the gas mixture of claim 18, said contacting selected from the group consisting of directly contacting, indirectly contacting, or combination thereof.

20. A heat transfer fluid gas mixture consisting essentially of substantially pure hydrogen and substantially pure helium for use in heat transfer applications, the hydrogen having a concentration ranging from about 50 mole percent to about 99.9 mole percent, wherein:
   a) the mixture will not be capable of mixing with air in any proportions to produce a self-sustaining flammable or combustible mixture, or
   b) wherein a concentration of hydrogen is sufficient to reduce cost of the mixture to an amount substantially less than cost of pure helium.

21. A method of cooling or heating an item, the method comprising contacting the item with the gas mixture of claim 20, said contacting selected from the group consisting of directly contacting, indirectly contacting, or combination thereof.

22. A heat transfer fluid gas mixture consisting of substantially pure hydrogen and substantially pure helium for use in heat transfer applications, wherein the hydrogen has a concentration ranging from about 40 mole percent to about 50 mole percent.

23. A method of cooling or heating an item, the method comprising contacting the item with the gas mixture of claim 22, said contacting selected from the group consisting of directly contacting, indirectly contacting, or combination thereof.

24. A heat transfer fluid gas mixture consisting of substantially pure hydrogen and substantially pure helium for use in heat transfer applications, wherein the hydrogen has a concentration ranging from about 50 mole percent to about 99.9 mole percent.

25. A method of cooling or heating an item, the method comprising contacting the item with the gas mixture of claim 24, said contacting selected from the group consisting of directly contacting, indirectly contacting, or combination thereof.

* * * * *